Aug. 1, 1939.   E. C. EBERTS ET AL   2,167,881
METHOD OF TREATING LIQUIDS AND SEMILIQUIDS
Filed Feb. 11, 1937
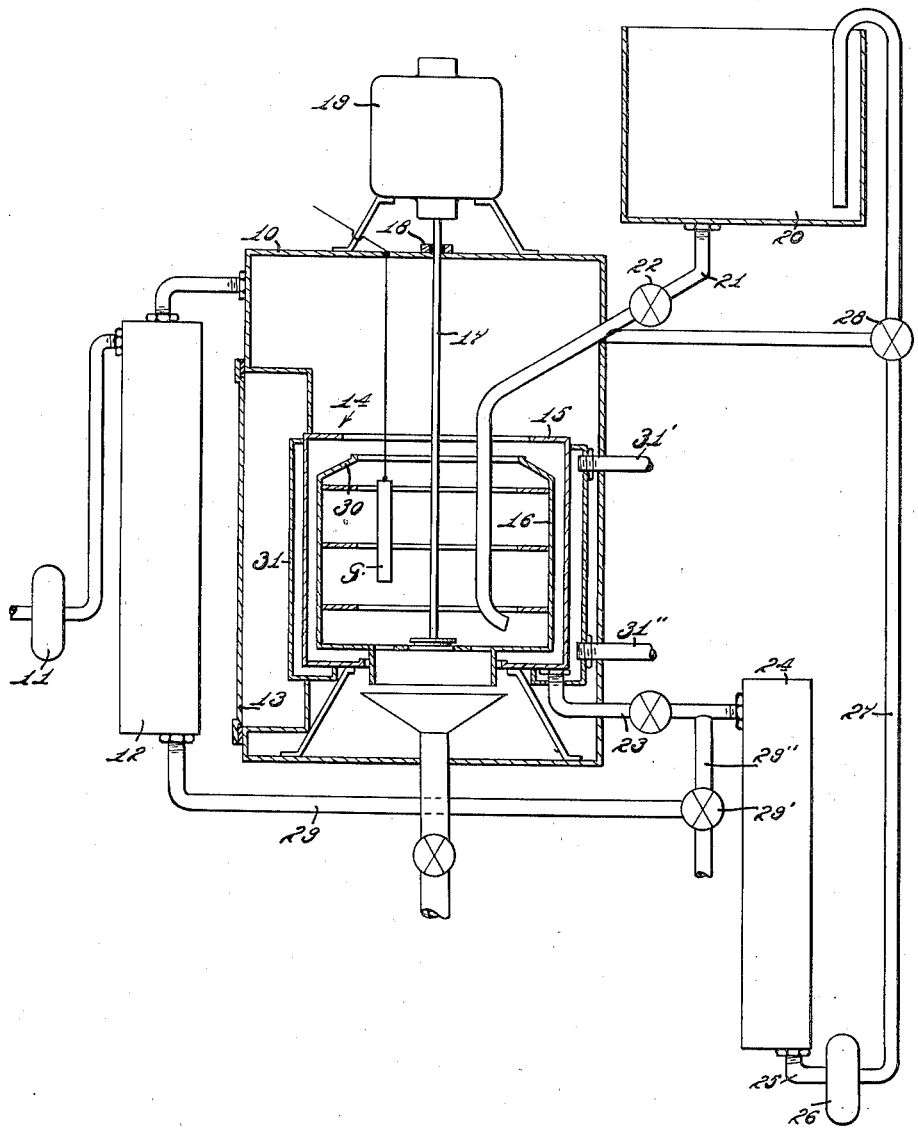
INVENTORS.
Edward C. Eberts and
BY   Kenneth M. Eberts,
Hood & Hahn.
ATTORNEYS.

Patented Aug. 1, 1939

2,167,881

UNITED STATES PATENT OFFICE 2,167,881

METHOD OF TREATING LIQUIDS AND SEMILIQUIDS

Edward C. Eberts and Kenneth M. Eberts, Indianapolis, Ind.

Application February 11, 1937, Serial No. 125,176

6 Claims. (Cl. 99—205)

In the production of tomato catsup it is necessary that a portion of the natural water content of the raw fruit be extracted, but it is also highly desirable that certain of the water borne solubles be retained in the end product. When the macerated raw fruit is subjected to boiling at super-atmospheric temperatures and normal atmospheric pressures, as is common custom, the unavoidable ebulition results in an undesirable absorption of ambient air as well as loss of flavor and color, all to the detriment of the ultimate product, and difficulty is experienced in obtaining uniformity of concentration and consistence in successive batches.

The primary object of our present invention is to provide an improved method for the treatment of tomatoes to produce an end product lacking in occluded air and, if desired, lacking a predetermined proportion of the natural water content while at the same time preventing the absorption of air and the loss of desirable color and flavor constituents.

It will be readily understood, from the following description, that our improved method will be useful for the purpose of concentrating various other liquids and semi-liquids, and that we do not wish to be limited to the specific material heretofore mentioned, except as specifically claimed.

The accompanying drawing diagrammatically illustrates our invention.

In the drawing 10 indicates an air-tight chamber within which may be maintained any desired degree of sub-atmospheric pressure by any suitable means such as an exhauster 11 between which and chamber 10 is interposed a condenser 12. Access to the interior of chamber 10 is had through a door 13 properly packed to prevent ingress of air when closed.

Within chamber 10 is mounted a centrifuge 14 of well known form, comprising a non-rotary bowl 15 within which is mounted a rotary bowl 16 which may be driven at high speed through the medium of shaft 17 projected outwardly through one wall of chamber 10 through an air tight packing gland 18 and driven by a motor 19. The centrifuge should be of such type that material introduced thereinto may be subjected to a centrifugal force many times greater than gravity.

A feed tank 20 is provided with a discharge conduit 21 which leads to the inlet of bowl 16 and is provided with a control valve 22, conduit 21 entering chamber 10 in such manner as to avoid air inlet.

Leading from the non-rotary bowl 15 is a discharge conduit 23 delivering to a reservoir 24; the discharge conduit 25 leads to a pump 26 which delivers to conduit 27 delivering selectively through valve 28 to tank 20, preferably at a point below the normal liquid level in said tank and preferably in such manner that the contents of the pipe 25 will not be subjected to hydrostatic pressure of the contents of tank 20, or to conduit 21 between valve 22 and bowl 16, so that air-free circulation of the effluent of bowl 16 may be obtained.

Condenser 12 is provided with a conduit 29 leading either to waste through valve 29', or through conduit 29" to reservoir 24 (or any other suitable reservoir) so that the liquid effluent from the condenser may be returned to the system if desired.

Liquid or semi-liquid material placed in tank 20; and the desired degree of sub-atmospheric pressure being established within chamber 10; and bowl 16 of the centrifuge being rotated at desired speed, flow of material from tank 20, in a controlled stream determined by the setting of valve 22, will form a cylindrical stream of relatively small depth within the bowl and, because of the existence of sub-atmospheric pressure within the chamber 10, substantially maintained by the action of the exhauster, those constituents of the stream, to the extent of their volatility or extractability dependent upon ambient temperature and pressure, will be extracted as the material flows through the rotating bowl and is discharged into the stationary bowl and, to the extent of such extraction will be concentrated, as for instance, occluded air will be extracted; water content will be volatilized and extracted, etc.

Extraction of volatile or entrapped gaseous constituents of liquids and semi-liquids is generally evidenced by ebulition, more or less violent, depending upon the rate of volatilization or eruption and the weight of the material, as compared with its ambient medium and where violent ebulition occurs there is afforded an opportunity for absorption of part of the ambient gaseous medium.

In the present instance, the weight of the material being treated is artificially increased by reason of the centrifugal force generated therein by the centrifuge and consequently the violence of ebulition, due to the emergence of the gaseous constituent, is substantially depressed so that the liquid being concentrated is less violently torn apart and consequently less liable to absorb portions of the gaseous ambient medium.

In order to better explain the value of the method and apparatus described above, consideration of the applicability thereof to the production of a concentrated tomato product such as catsup will be helpful.

The cooked and macerated tomatoes (from which skins, seeds, and stems have been separated by any well known means) have a water content much too great for acceptable catsup and consequently a desired proportion of this water content must be extracted but that water content entraps certain color and flavor ingredients highly desirable in the finished product.

If, therefore, a measured quantity of freshly macerated raw, or partially cooked, tomatoes be placed in tank 20 and bowl 16 is provided at its mouth with one or more inwardly projecting annular flanges 30 which will give to the bowl 16 a retention capacity equal to the volume to which the initial volume is to be concentrated, and the apparatus be put into motion, the mixture entering the bowl 16 will accumulate within the bowl, the pulp particles having a constant tendency to pack into the higher gravity regions, until the watery effluent passes over the inner edge of upper flange 30 in a shallow annular stream into bowl 15 and thence through conduits 23 and 25 and back to tank 20. And during this operation the inner peripheral surface of the annular volume of material within the bowl 16 (as well as the downwardly flowing film of liquid in bowl 15) will be subjected to the sub-atmospheric pressure maintained within chamber 10 so that volatiles and entrapped gases will be extracted therefrom, passing from chamber 10 into the condenser 12 where there will be a separation of lighter volatiles, such as air, from a condensate. The operation may be carried on until discharge from bowl 16 ceases, at which time the desired degree of concentration will have been attained, whereupon rotation of bowl 16 may be discontinued, door 13 opened, and the concentrate removed.

If de-aeration only is desired bowl 16 need not be equipped with the inwardly projecting flanges 30, and in that event any condensate from condenser 12 may be returned to tank 20 and the operation continued until the desired percentage of naturally occluded air extraction has been attained.

It will be readily understood that the contents of chamber 10, and the material under process of treatment, may be maintained at any desired temperature either super-atmospheric or sub-atmospheric, by any well known means, to facilitate the above-described operations in accordance with the physical characteristics of the material under treatment.

Bowl 16 may be provided with a heat-exchange jacket 31 by which bowl 16 may be either heated or refrigerated to a desired degree by a desirable medium circulated through pipes 31', 31''.

Material under treatment as above described is in especially good condition for subjection to the action of ultra-violet rays, germicidal rays, etc., for the reason that an appropriate ray source G may be suspended within bowl 16 where the rays therefrom will act uniformly upon the thin annular stream of material, as it flows through and from the bowl.

In the production of a concentrated tomato product, as above described, the pulp constituent very quickly accumulates within bowl 15 and, concurrently, the more liquid constituent (commonly called serum) circulates through the system for repeated subjection to the concentration operation so that concentrating extractions are rather closely limited to those particular constituents in the mass which are especially in need of concentration.

It will be readily understood that the above described method is applicable to a wide variation of materials, and by reference specifically to tomatoes, we do not wish to be understood as indicating any degree of limitation other than as specifically hereinafter claimed.

It will be readily understood that the effluent from bowl 16 may be circulated through the system or returned to bowl 15 without passing through tank 20 without departing from the spirit of our invention, i. e., by proper manipulation of valves 22 and 28.

In the production of tomato juice beverage, the material placed in tank 20 will be a measured quantity comprising the major watery content and a selected volume of solids in finely divided form, and bowl 16 will have a retention capacity, relative to the above-mentioned measured quantity, which will determine the desired degree of concentration so that, when outflow through 23 ceases, the operator will know that the desired degree of concentration will have been reached. The material retained in bowl 16 may then be a highly concentrated product much too thick to drink but to which a desired volume of potable water, from any source, may be added to produce a desired beverage.

Irrespective of whether the centrifugal bowl has a definite retention capacity (as by reason of the inwardly projecting lips 30) or is a uniform diameter bowl with no inwardly projecting flange, the fluent or semi-fluent material which is introduced into the rotating wall is composed of two ingredients, i. e., the purely liquid ingredient which, for convenience, may be termed the supernatant liquid, and the insoluble solid ingredient which is a flocculent ingredient in many cases of such character as to remain indefinitely in suspension in the liquid and when such a mixture is introduced into the rotating centrifugal bowl, there will be built up within the bowl, before there will be any discharge therefrom, an annular layer of mixture, the radial depth of which will vary from a minimum, which will be determined by the viscosity of the mixture and the coefficient of adhesion of the flocculent material to the bowl wall, up to a maximum which will be determined by the extent of inward projection of the retaining flanges 30. Throughout this range, however, before there will be any discharge from the bowl, the annular stream of mixture, to which I have referred, will be composed of two annular streams, the outer one of which will comprise the flocculent though possibly lighter insoluble solids adhering to the bowl wall, and the supernatant liquid impressed upon the inner surface of the annular stream of flocculent material by a pressure determined by the centrifuging value of the rotating bowl. The annular stream of flocculent material will be protected from immediate association with the low pressure ambient atmosphere in the vacuum chamber and it will be only the inner surface of the annular stream of supernatant liquid which will be immediately associated with this low pressure ambient atmosphere and consequently the surrender of gaseous (air) content or vaporized water content will occur from the immediately exposed inner surface of the annular stream of supernatant liquid. The inner surface of the annular stream of insoluble solids will be subject to the pressure imposed thereon by the annular stream of supernatant liquid so that there will be a differential pressure respectively upon the inner surface of the annular stream of insoluble solids and the inner surface of the annular stream of supernatant liquid.

As a consequence of all this, it will be readily apparent that while the mixture as a whole may be subjected to superatmospheric temperatures, sufficient, in view of the sub-atmospheric pressures within the vacuum chamber, to permit boiling at the inner surface of the inner annular stream of supernatant liquid, it becomes possible to concentrate or deaerate (either or both) the supernatant liquid without damage to the insoluble solid content, although the insoluble solids and the supernatant liquid are simultaneously subjected to the ambient temperatures.

As previously stated; if it is desired only to deaerate, such deaeration may be caused to occur at such temperatures, relative to the ambient sub-pressures, as to cause a surrender of a portion of the aqueous content but if it is desired that no liquid concentration be accomplished and that the primary liquid volume be retained in the end product, the desired result is attainable by returning to the apparatus, or to the ultimate effluent from the centrifugal bowl, the condensate acquired from condenser 12.

We claim as our invention:

1. The method of treating flowable material containing a volatile which comprises the step of operating in vacuum a centrifuge capable of retaining a predetermined volume of material, the step of flowing said material into said centrifuge to its retention capacity, the step of overflowing said material through said centrifuge, and the step of returning the effluent from said centrifuge into the centrifuge until desired concentration has been attained.

2. The method of treating flowable material comprising solids and a volatile which comprises the step of operating in vacuum a centrifuge capable of retaining a predetermined volume of material, the step of flowing said material into said centrifuge to its retention capacity, the step of overflowing said material through said centrifuge, and the step of returning the effluent from said centrifuge into the centrifuge until overflow of the centrifuge ceases by reason of condensation of the volatile.

3. The method of treating macerated comestibles, which comprises the step of operating in a vacuum a centrifuge capable of retaining a predetermined volume of tomato, the step of flowing said tomato into said centrifuge to its retention capacity, the step of overflowing said tomato through said centrifuge, and the step of returning the effluent from said centrifuge into the centrifuge until desired concentration has been attained.

4. The method of treating macerated comestibles, which comprises the step of operating in vacuum a centrifuge capable of retaining a predetermined volume of tomato, the step of flowing said tomato into said centrifuge to its retention capacity, the step of overflowing said tomato through said centrifuge, and the step of returning the effluent from said centrifuge into the centrifuge until overflow of the centrifuge ceases.

5. The method of treating a flowable mixture acquired from macerated comestibles and composed of insoluble solids and a volatile-content supernatant liquid, which consists in the establishment of two surface contacting layers of said two ingredients, one layer predominantly solids and of predetermined thickness and the other layer predominantly supernatant liquid, the impressment of the layer of predominant solids upon a surface by pressure exceeding the weight of said layer, the passage of a stream of the predominant supernatant liquid layer over and in contact with the first-mentioned layer through an ambient gaseous medium contacting the exposed surface of the stream at a subatmospheric pressure and the return of the effluent of the stream layer to contact with the predominant solid layer for further treatment.

6. The method of treating a selected volume of macerated comestibles which comprises the step of subjecting the mixture to centrifugal treatment in a vacuum, the step of retaining a predetermined volume thereof within the centrifuge, the step of flowing surplus through and from the centrifuge into a selective condenser, and the step of returning the condensate from said condenser to the centrifuge until a desired condensation of the original material has been attained.

EDWARD C. EBERTS.
KENNETH M. EBERTS.